No. 729,848. PATENTED JUNE 2, 1903.
A. A. COMMON.
GALILEAN TELESCOPE.
APPLICATION FILED OCT. 20, 1902.
NO MODEL.
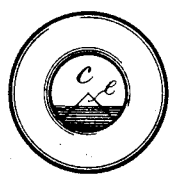 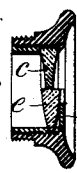 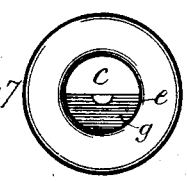
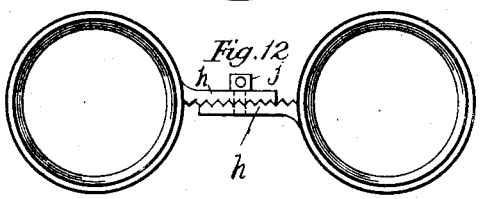  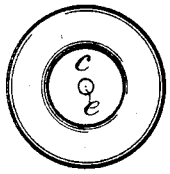
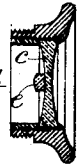 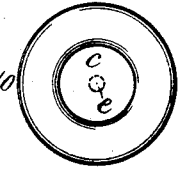
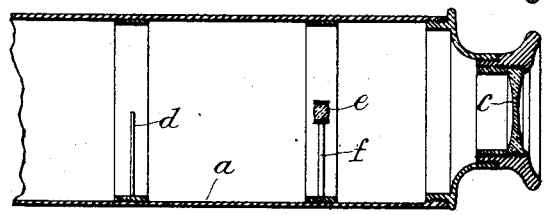 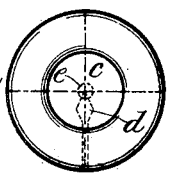
Witnesses:
Fred Haynes
Henry Thieme
Inventor:
Andrew Ainslie Common
by attorneys
Brown & Seward No. 729,848.

Patented June 2, 1903.

UNITED STATES PATENT OFFICE.

ANDREW AINSLIE COMMON, OF EALING, ENGLAND.

GALILEAN TELESCOPE.

SPECIFICATION forming part of Letters Patent No. 729,848, dated June 2, 1903.

Application filed October 20, 1902. Serial No. 127,908. (No model.)

*To all whom it may concern:*

Be it known that I, ANDREW AINSLIE COMMON, a subject of the King of Great Britain, and a resident of 63 Eaton Rise, Ealing, in the county of Middlesex, England, have invented certain new and useful Improvements Relating to Galilean Telescopes, of which the following is a specification.

In the accompanying drawings, Figure 1 shows in longitudinal section a Galilean telescope with my invention adapted thereto. Figs. 2, 3, 4, and 5 are similar views of the eyepiece of a telescope, showing various plans for carrying the invention into effect. Figs. 6 to 11 are front views of the eye-lens with the invention applied thereto, and Fig. 12 shows a plan of fixing the two tubes of a binocular for various widths of eyes.

The same letters of reference will apply to corresponding parts in all the figures.

The chief object of this invention is to adapt a Galilean telescope for the purpose of sighting guns; but the invention is also applicable for other purposes—for instance, as a telescope for use with a theodolite and similar instruments; and to this end it consists in the combination, with the telescope, of a collimator and a fiducial mark.

In a Galilean telescope the rays entering the object-glass converge therefrom to the eye-lens, by which they are rendered parallel in order that the eye may see the image (which is a virtual one) of the object viewed; but supposing a fiducial mark (cross-wires or otherwise) be placed in the tube at a point between the eye-lens and the object-glass the latter will be rendered ineffective so far as the mark is concerned and the rays of light starting from the mark will diverge toward the eye-lens and on passing through it will still further diverge, so that the mark will be invisible to the eye, because the eye is only capable of bringing into focus parallel or nearly parallel rays and cannot therefore see the rapidly-diverging rays. Thus for effecting the purpose of this invention means must be provided for parallelizing the divergent rays, so as to bring the mark into focus without impeding the view of the object by the telescope.

In carrying out this invention I adapt to the concave eye-lens a portion of a convex lens of suitable focal length, which constitutes the collimator, and I place the fiducial mark between the eye-lens and the object-glass at the focus of the collimator. The light coming from the mark emerges from the lens or any part of it as a pencil of light parallel to the line joining the center of the mark and the optical center of the lens, thus giving a permanent line of collimation. The object can then be seen by the telescope in the usual way through the concave eye-lens, and by bringing the eye partly in the pencil of rays coming through the convex portion the fiducial mark can also be seen and superposed on the object—that is to say, by replacing part of the concave eye-lens by a portion of a suitable convex lens or by making part of a convex lens coact with the concave lens the diverging rays from the fiducial mark will be parallelized in passing through the convex portion and the mark will be brought into focus, so that the mark will be seen in conjunction with the object as seen through the concave portion of the eye-lens and the object-glass.

Proceeding now to describe the apparatus, *a* is the Galilean telescope.

*b* is the object-glass, which may be so arranged that the focus of the telescope will be obtained by moving the glass in any convenient manner.

*c* is the eye-lens, and *d* the fiducial mark.

*e* is the collimator, which may take various forms. Thus it may consist of half a double convex lens *e*, placed just inside and close to the eye-lens *c* and acting optically with it, so that the resulting focal length will be somewhat less than the distance between the object-glass and eye-lens, as shown in Figs. 1 and 6, or it may be half a convex lens *e* of suitable focal length, placed below a half of the concave eye-lens *c*, as seen at Figs. 2 and 7, or the collimator *e* may be in the form shown at Fig. 8. These are the forms I prefer, as the eye can see through either half-lens or part of a lens by a slight change in position of the eye. In order to render the sighting more easy, I may employ a screen *g* in front of the lower part of the convex lens *e*, which will leave only a small part of the lens open to view, and thus the eye of the user will be, so to speak, guided to the proper position to obtain the desired effect. The collimator may, however, take the form of part of a convex lens $e$ of less diameter than the pupil of the eye, placed centrally in the concave lens $c$, as shown at Figs. 3 and 9, or it may be a similar small convex lens $e$, attached in any convenient manner to the center of the concave lens $c$ on the inside, as shown at Figs. 4 and 10. The collimator may also be placed in a special holder $f$ in the tube $a$ of the telescope at some distance from the eye-lens.

The fiducial mark $d$ may take any of the well-known forms, such as cross-wires or a pointer with a diamond-shaped point for use at night when the cross-wires might not be visible; but it will also be obvious that any well-known suitable contrivance, such as an oblique pencil of artificial light, may be employed to fall on the intersection of the wires, and thus light up the point of intersection, if the cross-wires are preferred, in a manner now well understood.

When used for sighting guns, I prefer the binocular form of the telescope with the object-glasses to move for focusing. In this case one tube only need be provided with the collimator and the fiducial mark, the other being an ordinary Galilean telescope.

For getting the exact width of the axes of the two telescopes to suit the width of the eyes of the user I employ a device—such, for instance, as that shown at Fig. 12—in which each telescope is provided with a laterally-extending dog-toothed rack $h$, which are brought together in the desired position and secured by the clamping-screw $j$.

What I claim as my invention, and desire to secure by Letters Patent, is—

1. In a Galilean telescope, the combination of a collimator consisting of part of a convex lens or its equivalent, to be used in conjunction with the eye-lens of the telescope and a fiducial mark, placed at or near the center of the telescope, as herein shown and described and for the purpose set forth.

2. In a gun-sighting apparatus, the combination of two Galilean telescopes placed side by side, one of which is provided with a collimator, consisting of part of a convex lens or its equivalent, to be used in conjunction with the eye-lens, and with a fiducial mark, placed at or near the center of the telescope, and the other telescope without a collimator or fiducial mark, together with means for adjusting the distance of one telescope from the other to suit the width between the eyes of the user, consisting of the laterally-extending dog-toothed racks $h$ and the clamping-screw $j$, all as herein shown and described and for the purpose set forth.

In testimony whereof I have signed my name to this specification in the presence of two subscribing witnesses.

ANDREW AINSLIE COMMON.

Witnesses:
ALFRED S. BISHOP,
WILLIAM MACKINTOSH.